(12) United States Patent
Tang et al.

(10) Patent No.: US 6,344,948 B1
(45) Date of Patent: Feb. 5, 2002

(54) PADDED DISC HEAD SLIDER HAVING SHALLOW LOAD POINT FOR REDUCED TIPPING

(75) Inventors: Huan Tang; Jing Gui, both of Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/404,018

(22) Filed: Sep. 23, 1999

Related U.S. Application Data (60) Provisional application No. 60/100,902, filed on Sep. 23, 1999.

(51) Int. Cl.$^7$ .......................... G11B 21/21; G11B 17/32; G11B 5/60
(52) U.S. Cl. .................................................. 360/234.6
(58) Field of Search ........................... 360/234.6, 235.4, 360/237

(56) References Cited

U.S. PATENT DOCUMENTS

| | | | |
|---|---|---|---|
| 3,158,847 A | * 11/1964 | Pulkraber | |
| 3,430,006 A | * 2/1969 | Taylor et al. | |
| 3,612,775 A | * 10/1971 | Miller | 360/103 |
| 3,774,183 A | * 11/1973 | Roscamp | 360/103 |
| 4,258,400 A | * 3/1981 | Lazzari | 360/103 |
| 4,261,024 A | * 4/1981 | Desserre | 360/103 |
| 4,605,977 A | 8/1986 | Matthews | 360/103 |
| 4,646,180 A | 2/1987 | Ohtsubo | 360/103 |
| 4,700,250 A | * 10/1987 | Kuriyama | 360/104 |
| 4,724,500 A | * 2/1988 | Dalziel | 360/103 |
| 4,814,906 A | 3/1989 | Suzuki et al. | 360/75 |
| 4,893,204 A | 1/1990 | Yamada et al. | 360/103 |
| 4,984,114 A | 1/1991 | Takeuchi et al. | 360/103 |
| 5,079,659 A | * 1/1992 | Hagen | 360/104 |
| 5,200,868 A | 4/1993 | Chapin et al. | 360/103 |
| 5,299,079 A | 3/1994 | Kuroda | 360/103 |
| 5,299,080 A | * 3/1994 | Mizuno et al. | 360/103 |
| 5,327,311 A | 7/1994 | Ananth et al. | 360/103 |
| 5,367,419 A | * 11/1994 | Kazama | 360/103 |
| 5,850,320 A | * 12/1998 | Warmka et al. | 360/104 |
| 6,185,071 B1 | * 2/2001 | Asani et al. | 360/236.6 |

FOREIGN PATENT DOCUMENTS

| | | |
|---|---|---|
| JP | 54-151425 | 11/1979 |
| JP | 60-101781 | 6/1985 |
| JP | 1211383 | 8/1989 |
| JP | 2049281 | 2/1990 |
| JP | 2053256 | 2/1990 |
| JP | 1319188 | 1/1991 |
| JP | 8-249848 | * 9/1996 |

* cited by examiner

*Primary Examiner*—William Klimowicz
(74) *Attorney, Agent, or Firm*—Westman, Champlin & Kelly, P.A.

(57) ABSTRACT

A disc head slider includes a slider body having a leading slider edge, a trailing slider edge, a bearing surface, a back surface, which is opposite to the bearing surface, and a length measured from the leading slider edge to the trailing slider edge. First and second discrete pads extend normally from the bearing surface. The first pad is located forward of a midpoint along the length, and the second pad is located rearward of the midpoint and forward of the slider trailing edge. A recess is formed in the back surface and has a recess floor, which defines a load point surface located between the first and second pads along the length.

20 Claims, 7 Drawing Sheets

PADDED DISC HEAD SLIDER HAVING SHALLOW LOAD POINT FOR REDUCED TIPPING

CROSS REFERENCE TO RELATED APPLICATION

This application claims the benefit of U.S. Provisional Application Serial No. 60/100,902, entitled "SHALLOW SLIDER LOAD POINT FOR REDUCED TIPPING OF SLIP HEADS," filed Sep. 23, 1999.

BACKGROUND OF THE INVENTION

The present invention relates to disc drive data storage systems and, more particularly, to a disc drive data storage system having a padded slider which resists tipping relative to the disc surface.

Disc drives of the "Winchester" type are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase which creates a hydrodynamic lifting force that counteracts the load force and causes the slider to lift and fly above or in close proximity to the disc surface.

Discs are typically coated with a lubricant to reduce wear at the slider-disc interface. However, the disc lubricant tends to increase the sticking friction ("stiction") between the slider and the disc surface during the start and stop of disc rotation. Sliders are now being proposed that have geometries designed for reducing stiction. For example, discrete raised pads or "bumps" can be fabrication on the bearing surface, which have a small surface area as compared to the bearing surface and provide a slight separation between the bearing surface and the disc surface. This separation can assist the slider in overcoming stiction during contact start/stop ("CSS") operations.

However, these raised pads can increase a tendency of the slider to "tip"backwards under certain operating conditions. Improved slider geometries are desired, which reduce the tendency of the slider to tip backwards.

SUMMARY OF THE INVENTION

One aspect of the present invention relates to a disc head slider having a slider body with a leading slider edge, a trailing slider edge, a bearing surface, a back surface, which is opposite to the bearing surface, and a length measured from the leading slider edge to the trailing slider edge. First and second discrete pads extend normally from the bearing surface. The first pad is located forward of a midpoint along the length, and the second pad is located rearward of the midpoint and forward of the slider trailing edge. A recess is formed in the back surface and has a recess floor, which defines a load point surface located between the first and second pads along the length.

Another aspect of the present invention relates to a disc drive suspension assembly, which includes a disc head slider and a suspension. The disc head slider includes a slider body having a leading slider edge, a trailing slider edge, a bearing surface, a back surface, which is opposite to the bearing surface, a length measured from the leading slider edge to the trailing slider edge, and a nominal thickness measured from the back surface to the bearing surface. First and second discrete pads extend normally from the bearing surface. The first pad is located forward of a midpoint along the length, and the second pad is located rearward of the midpoint and forward of the slider trailing edge. The suspension supports the disc head slider and has a load point, which contacts the disc head slider at a location that is between the first and second pads along the length and at a vertical distance from the bearing surface that is less than the nominal thickness.

Yet another aspect of the present invention relates to a disc drive suspension assembly, which includes a suspension having a load point and a slider attached to the suspension for supporting a transducer relative to a disc surface and for receiving a load force through the load point.

DETAILED DESCRIPTION OF THE ILLUSTRATIVE EMBODIMENTS

Figure 1:
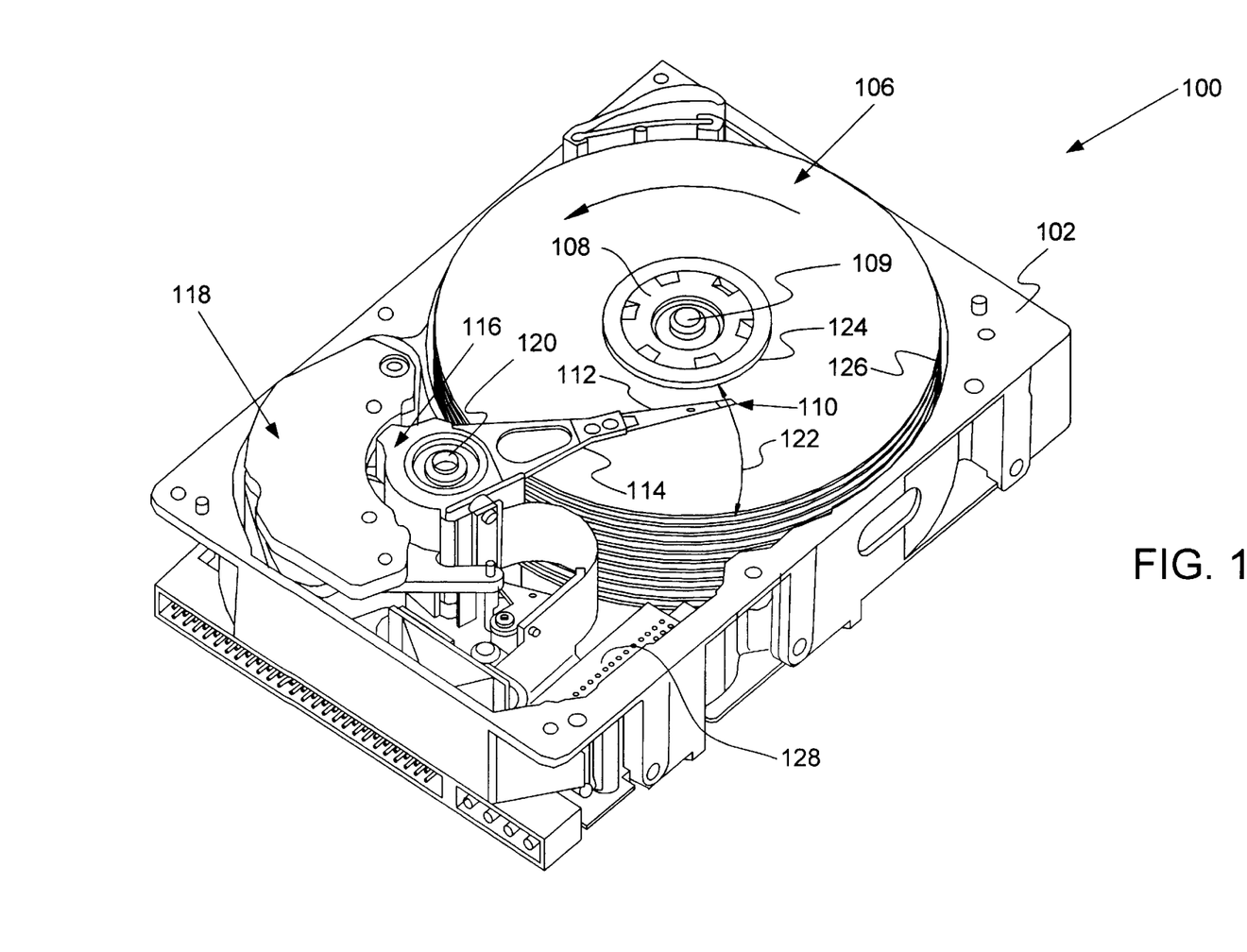
FIG. 1 is a perspective view of a disc drive in which the slider of the present invention can be used.

FIG. 1 is a perspective view of a disc drive 100 in which the present invention is useful. The same reference numerals are used in the various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about central axis 109. Each disc surface has an associated slider 110 which is mounted to disc drive 100 and carries a read/write head for communication with the disc surface. The disc surfaces are typically lubricated to reduce wear at the slider-disc interface.

In the example shown in FIG. 1, sliders 110 are supported by suspensions 112 which are in turn attached to track accessing arms 114 of an actuator 116. Suspensions 112 supply a load force to sliders 110 in a direction normal to the respective disc surfaces. The load force counteracts a hydrodynamic lifting force developed between each slider and the respective disc surface during disc rotation. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

Figure 2:
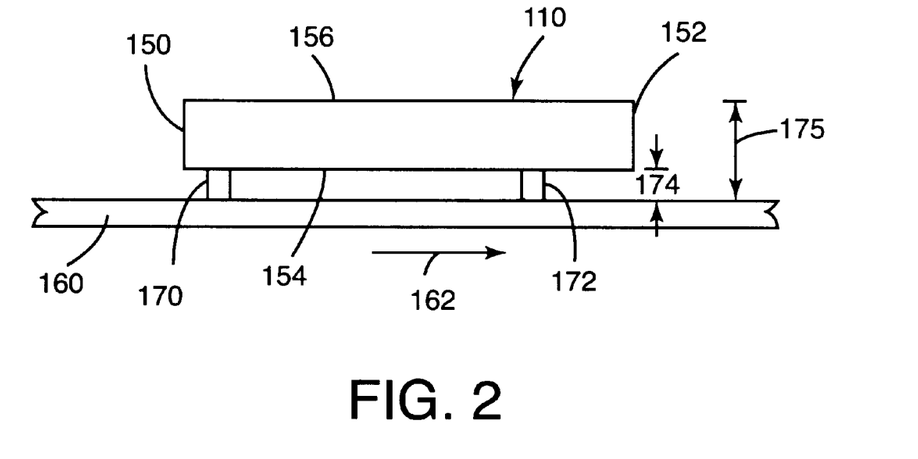
FIG. 2 is a side plan view of a slider used within the disc drive, according to one embodiment of the present invention.

FIG. 2 is a side plan view of slider 110 according to one embodiment of the present invention. Slider 110 has a leading edge 150, a trailing edge 152, a bearing surface 154 and a back surface 156, which is opposite to bearing surface 154. Bearing surface 154 faces the surface of disc 160. Disc 160 is one of the discs in disc pack 106, shown in FIG. 1, and rotates in the direction indicated by arrow 162.

Slider 110 has a plurality of discrete raised pads or "bumps" 170 and 172, which extend normally from bearing surface 154 toward the surface of disc 160. Pads 170 and 172 are greatly exaggerated in FIG. 2. These pads have a height 174, which is very small compared to the nominal thickness 175 of slider 110. For example, pads 170 and 172 can have a height of only 30 nm, while slider 110 can have a thickness of 0.2 mm. Pads 170 and 172 also have a small surface area as compared to bearing surface 154. Pads 170 and 172 and provide a slight separation between bearing surface 154 and the surface of disc 160. This separation reduces the sticking friction (i.e. "stiction") between bearing surface 154 and the surface of disc 160 during the start and stop of disc rotation.

Figure 3:
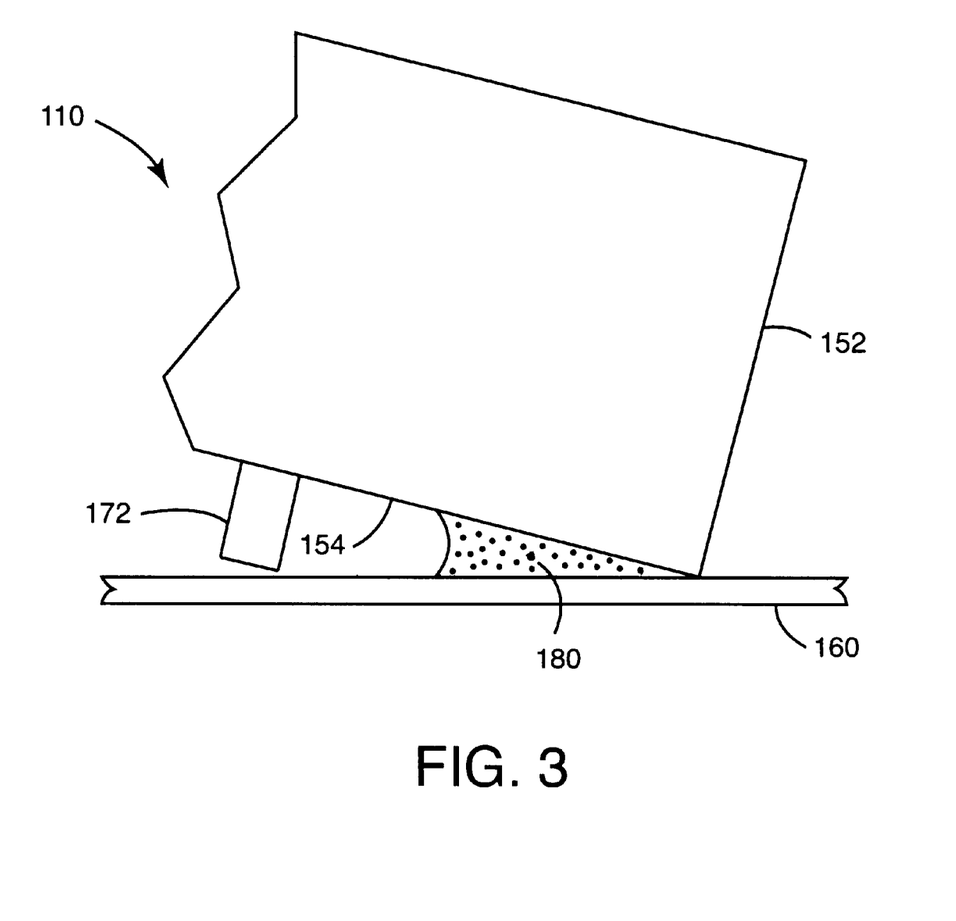
FIG. 3 is an enlarged, fragmentary view of the slider, which shows the slider in a tipped state relative to a disc surface.

During operation, when power to disc drive 100 is turned off, the rotational velocity of disc 160 decreases to zero. Inertia in disc 160 and back electromotive force (EMF) in the spindle motor windings can cause disc 160 to oscillate backward and forward slightly until all of the remaining energy is dissipated. Under certain operating conditions, the backwards rotation of disc 160 can cause slider 110 to tip backwards. FIG. 3 is an enlarged, fragmentary view of slider 110, which shows slider 110 in a tipped state relative to disc 160. Slider 110 is tipped backwards about pad 172 such that trailing edge 152 contacts the surface of disc 160. The lubricant on the disc surface creates a meniscus 180 between bearing surface 154 and disc 160. If meniscus 180 is sufficiently large, slider 110 can remain in the tipped state.

Figure 4:
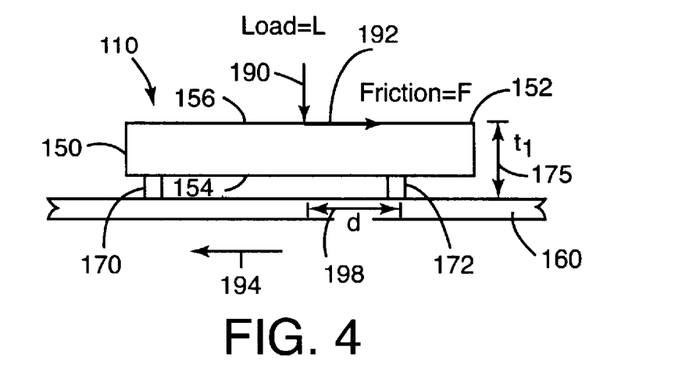
FIG. 4 is a side view of the slider, which illustrates a friction-induced mechanism for backward slider tipping.

There are three mechanisms that can cause head 110 to tip backwards. These mechanisms include friction, collection of disc lubrication at trailing edge 152, and trailing edge spacing loss. FIG. 4 is a side view of slider 110, which illustrates the friction-induced mechanism for backward slider tipping. The load force (L) supplied by suspension 112 is represented by vector 190. This load force is typically applied near the center of slider 110, along back surface 156. Vector 192 represents the friction force (F) applied to slider 110 through pads 170 and 172 when disc 160 rotates backwards in the direction of arrow 194. The thickness 175 (labeled "$t_1$") of slider 110 determines the length of the lever arm over which the friction force (F) 192 operates to tip slider 110. The product F*t is the magnitude of tipping torque applied to slider 110. Distance 198 (labeled "d") is measured from pad 172 to the lateral position at which load force (L) 190 is applied to slider 110. The product L*d is the magnitude of the anti-tipping torque applied to slider 110. If F*t is greater than L*d, slider 110 will tip backward as shown in FIG. 3.

The propensity for tipping is greatly enhanced if all three tipping mechanisms work simultaneously. If one of these mechanisms can be eliminated, or strongly suppressed, the propensity for tipping can be reduced substantially. In the present invention, the propensity for tipping is reduced by shortening the lever arm ($t_1$ in FIG. 4) on which the friction force (F) 192 operates. If the lever arm is shortened by a factor of two or more, the tipping torque is halved, which may be adequate to eliminate the friction-induced tipping mechanism altogether. If each of the three tipping mechanisms contributes equally to slider tipping, the elimination of one mechanism may reduce the overall tipping propensity by a factor of two at the minimum and as much as one order of magnitude if the joint effects of multiple mechanisms are also taken into consideration.

Figure 5:
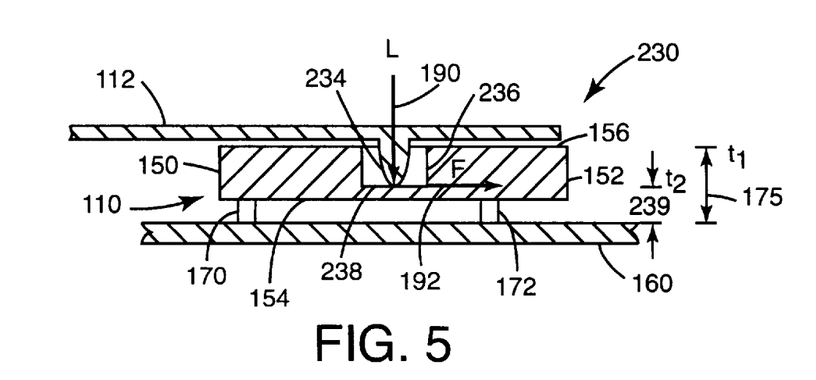
FIG. 5 is a schematic cross-sectional representation of a suspension apparatus in which the slider is configured to reduce the tipping torque applied to the slider.

FIG. 5 is a schematic, cross-sectional representation of a suspension apparatus 220 in which slider 110 is configured to reduce the lever arm and thus the tipping torque applied to slider 110. Suspension apparatus 220 includes suspension 112, which supports slider 110. Suspension 112 has a load point button 234, which extends downward toward back surface 156 of slider 110 for transferring the load force (L) 190 from suspension 112 to slider 110.

Slider 110 is formed with a recess 236 in back surface 156 for receiving load point button 234. Recess 236 has a recess floor 238, which defines a load point surface for contacting load point button 234. Recess 230 can be formed through photolithography processes such as ion milling, chemical etching or Reactive Ion Etching (RIE). Other processes can be used.

Since load point button 234 contacts slider 110 at recess floor 238, the slider 110 has a lever arm ($t_2$) 239, which is significantly shorter than lever arm ($t_1$) shown in FIG. 4. This significantly reduces the propensity of slider 110 to tip backwards in response to the backwards friction forces described above. In one embodiment, the nominal thickness 175 of slider 110 is approximately 0.2 mm, and recess 236 has a depth of 0.1 mm as measured from back surface 256.

The length of $t_2$ would therefore be about 0.1 mm. In the embodiment shown in FIG. 5, recess 236 has a cylindrical shape, with a circular cross-section in a plane parallel to back surface 156. Other cross-sectional shapes can also be used, such as rectangular or oval. Recess 236 can have a variety of diameters, as desired, such as 0.2 mm, for example. Other sizes can also be used.

Figure 6:
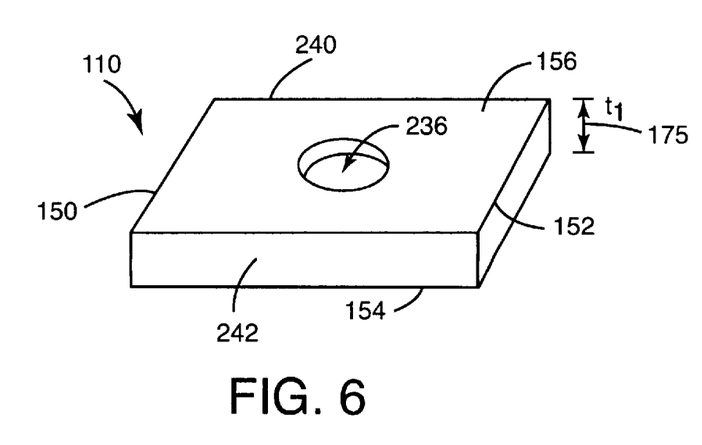
FIG. 6 is a perspective view of the slider, as viewed from a back surface, which illustrates a recess formed in the back surface in greater detail.

FIG. 6 is a perspective view of slider 110, as viewed from back surface 156, which illustrates recess 236 in greater detail. Recess 236 is limited to a central region of slider 110 such that slider 110 maintains the nominal thickness 175 in the area surrounding recess 230, between recess 236 and leading edge 150, trailing edge 152, and side edges 240 and 242. This maintains the structural rigidity and robustness of slider 110 and thereby prevents stress relief bending in slider 110.

Figure 7:
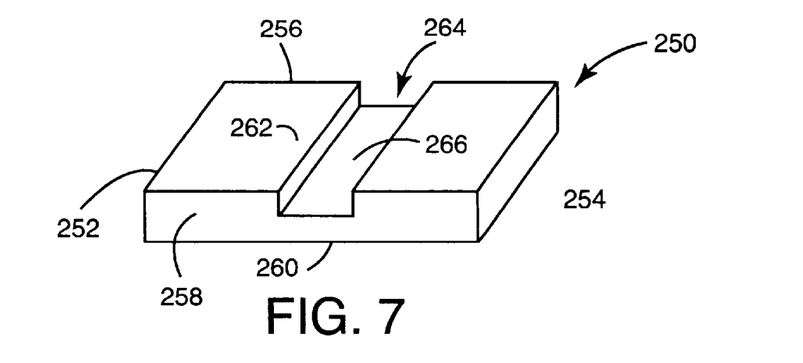
FIG. 7 is a perspective view of a slider according to an alternative embodiment of the present invention.

FIG. 7 is a perspective view of a slider 250 according to an alternative embodiment of the present invention. Slider 250 includes leading edge 252, trailing edge 254, side edges 256 and 258, bearing surface 260 and back surface 262. Slider 250 further includes a recess 264, which is formed as a slot in back surface 262. The slot extends from side edge 256 to side edge 258. Recess 264 has a recess floor 266, which is recessed from back surface 262 and defines a load point surface for receiving the suspension load force as in the embodiment shown in FIGS. 5 and 6.

Figure 8:
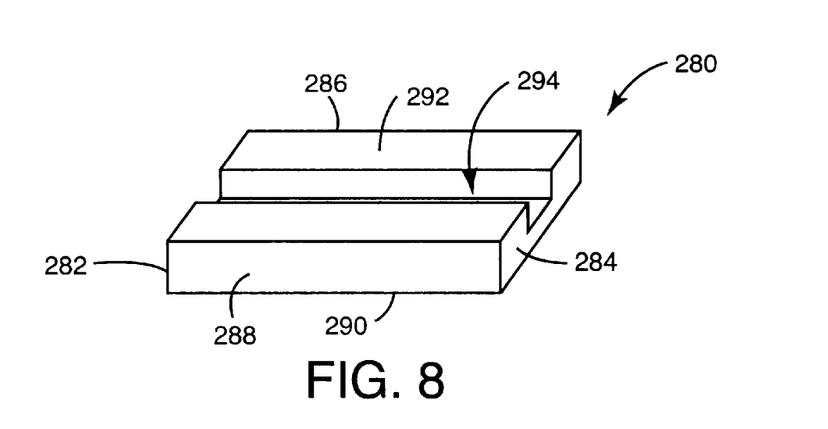
FIG. 8 is a perspective view of a slider according to another alternative embodiment of the present invention.

FIG. 8 is a perspective view of a slider 280 according to another alternative embodiment of the present invention. Slider 280 includes leading edge 282, trailing edge 284, side edges 286 and 288, bearing surface 290, back surface 292 and recess 294. In this embodiment, recess 294 is formed as a slot extending from leading edge 282 to trailing edge 284, through a central region of back surface 292.

Figure 9:
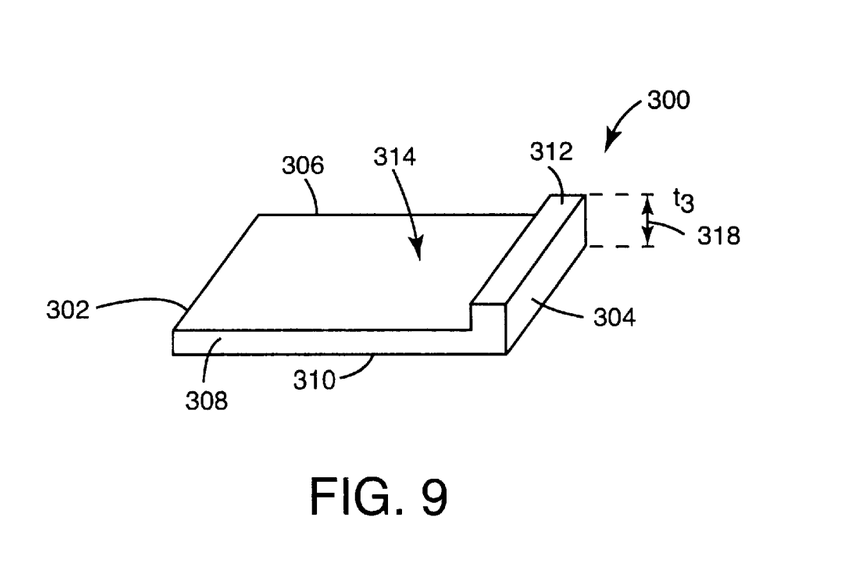
FIG. 9 is a perspective view of a slider according to yet another alternative embodiment of the present invention.

FIG. 9 is a perspective view of a slider 300 according to yet another alternative embodiment of the present invention. Slider 300 includes leading edge 302, trailing edge 304, side edges 306 and 308, bearing surface 310, back surface 312 and recess 314. Recess 314 extends from side edge 306 to side edge 308 and from leading edge 302 toward trailing edge 304. However, recess 314 terminates prior to trailing edge 304 such that a trailing portion 316 of slider 300 maintains a nominal thickness 318 (labeled "$t_3$"). Recess 314 has a recess floor 320 which forms a load point surface for receiving the suspension load force similar to the embodiments shown in FIGS. 5–8.

Figure 10:
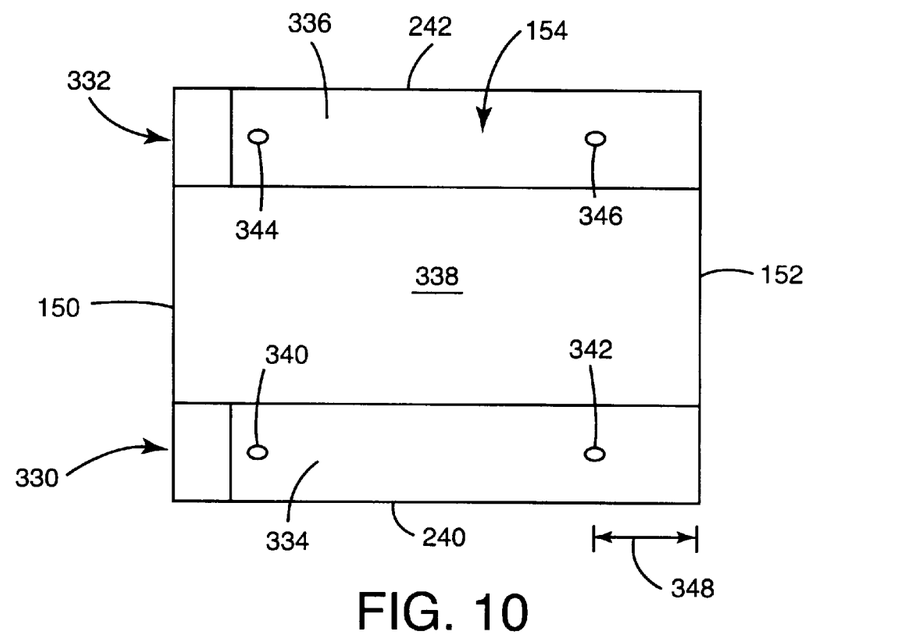
FIG. 10 is a bottom plan view illustrating the bearing surface of the slider shown in FIGS. 2–6 in greater detail, according to one embodiment of the present invention.

FIG. 10 is a bottom plan view illustrating the bearing surface of slider 110 (shown in FIGS. 2–6) in greater detail, according to one embodiment of the present invention. Slider 110 includes leading edge 150, trailing edge 152 and side edges 240 and 242. Side rails 330 and 332 extend along side edges 240 and 242, respectively, from leading edge 150 toward trailing edge 152. Side rails 330 and 332 have raised surfaces 334 and 336 with respect to a recessed surface 338, which together form bearing surface 154. Pads or "bumps" 340 and 342 extend normally from raised surface 334, and pads 344 and 346 extend normally from raised surface 336. As described in the embodiment shown in FIG. 2, pads 340 and 344 are positioned near leading edge 150, and pads 342 and 346 are positioned near trailing edge 152. However, pads 342 and 346 are spaced somewhat from trailing edge 152 by a distance 348. In alternative embodiments, any number of pads similar to pads 340, 342, 344 and 346 can be formed on bearing surface 154, and these pads can be placed in various locations. These pads can have various shapes such as circular (as shown in FIG. 10), oval or rectangular, for example. Although these pads can lead slider 110 to tip backwards as described above, the propensity of tipping can be limited by shortening the tipping torque lever arm as shown in FIGS. 5–9.

Figure 11:
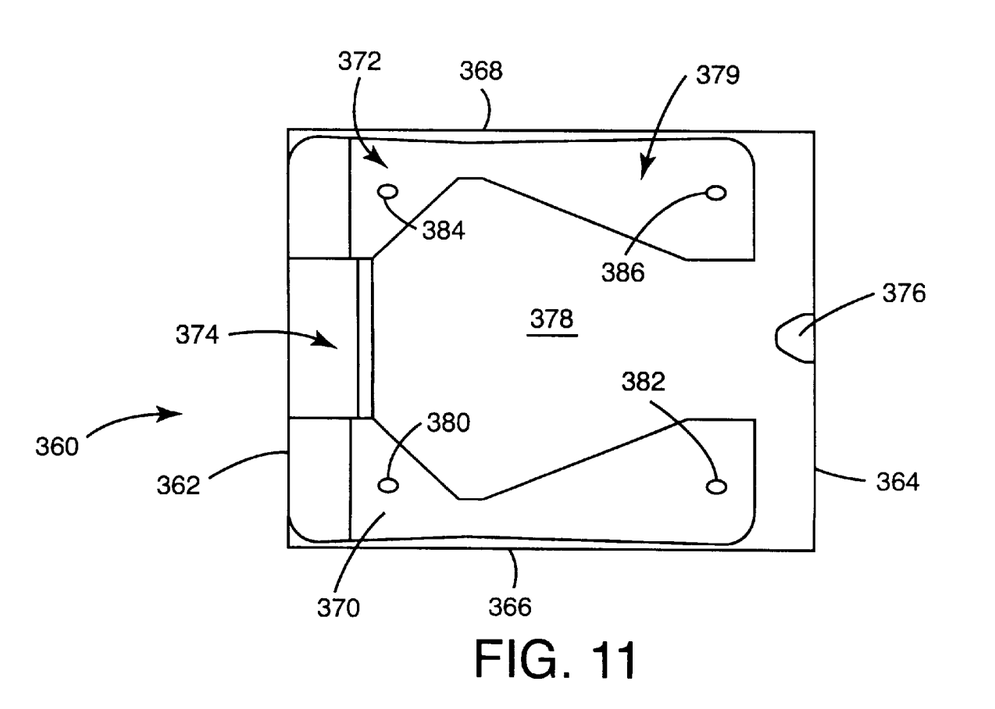
FIG. 11 is a bottom plan view of a slider having a different bearing geometry, according to an alternative embodiment of the present invention.

FIG. 11 is a bottom plan view of a slider 360 having a different bearing geometry according to an alternative embodiment of the present invention. Slider 360 includes leading edge 362, trailing edge 364, side edges 366 and 368, side rails 370 and 372, cross rail 374, center rail 376 and subambient pressure cavity 378. Side rails 370 and 372 and center rail 376 together define a bearing surface 379 of slider 360. Pads or "bumps" 380, 382, 384 and 386 extend normally from side rails 370 and 370. Numerous other bearing surface geometries can be used with the present invention. The geometries shown in FIGS. 10 and 11 are provided as examples only.

Figures 12, 13:
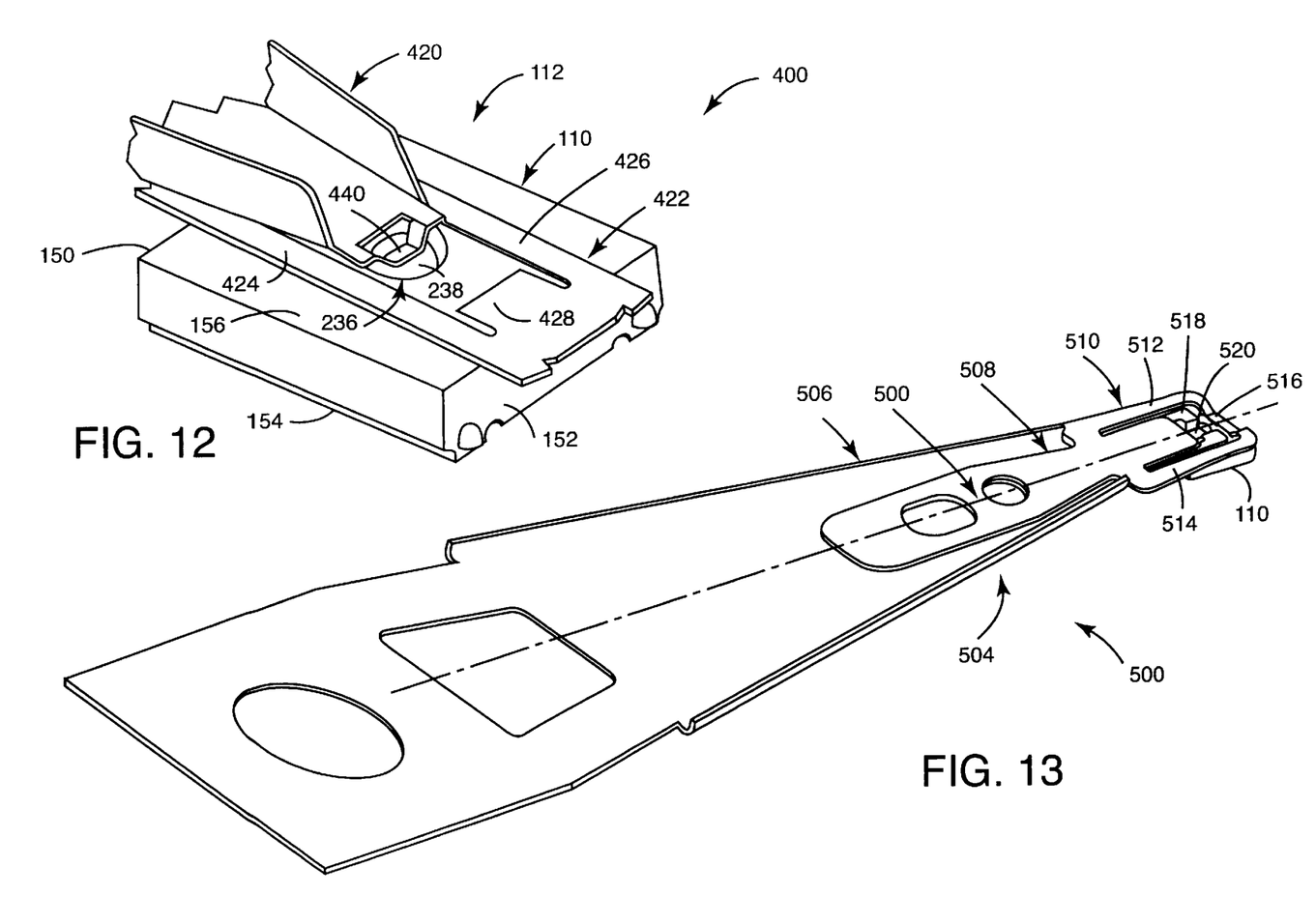
FIG. 12 is a perspective view of the distal end of a suspension assembly according to one embodiment of the present invention.
FIG. 13 is a perspective view of a suspension assembly according to an alternative embodiment of the present invention.

Similarly, the type of suspension used and its geometry can vary in alternative embodiments and will depend on the particular slider adopted and other design factors. The suspension can be a unitary suspension or a suspension having a separate load beam and gimbal, for example. FIG. 12 is a perspective view of the distal end of a suspension assembly 400 according to one embodiment of the present invention. Suspension assembly 400 includes suspension 112 (shown schematically in FIG. 5) which carries slider 110 (shown in FIGS. 2–6 and 10).

Suspension 112 includes load beam 420 and gimbal 422. Gimbal 422 is attached to the bottom surface of load beam 420, between load beam 420 and slider 110. Gimbal 422 includes gimbal arms 424 and 426 and a slider mounting tab 428. Slider mounting tab 428 is adhered to back surface 156 of slider 110. Load beam 420 has a load point button 234 (also shown schematically in FIG. 5), which is bent out-of-plane with respect to the main surface of load beam 420 so as to contact recess floor 238. Load beam 420 supplies the load force to slider 110 through load point button 234.

FIG. 13 is a perspective view of a suspension assembly 500 according to another alternative embodiment of the present invention. Suspension assembly 500 includes suspension 504, which carries slider 110. In this embodiment, suspension 504 includes a load beam 506 and a gimbal 508, which is attached to the back surface of load beam 506, with respect to slider 502. Gimbal 508 includes a proximal mounting section 509 attached to load beam 506 and a distal flexure portion 510 attached to slider 110. Flexure portion 510 includes gimbal arms 512 and 514 and mounting tab 516. Mounting tab 516 is bent out-of-plane with respect to gimbal arms 512 and 514 and is adhered to the back surface of slider 110. Load beam 506 has a distal end 518 having a load point button 520, which is bent out-of-plane with the main surface of load beam 506 and contacts slider 110 within recess 236 (shown in FIGS. 5–9).

Figure 14:
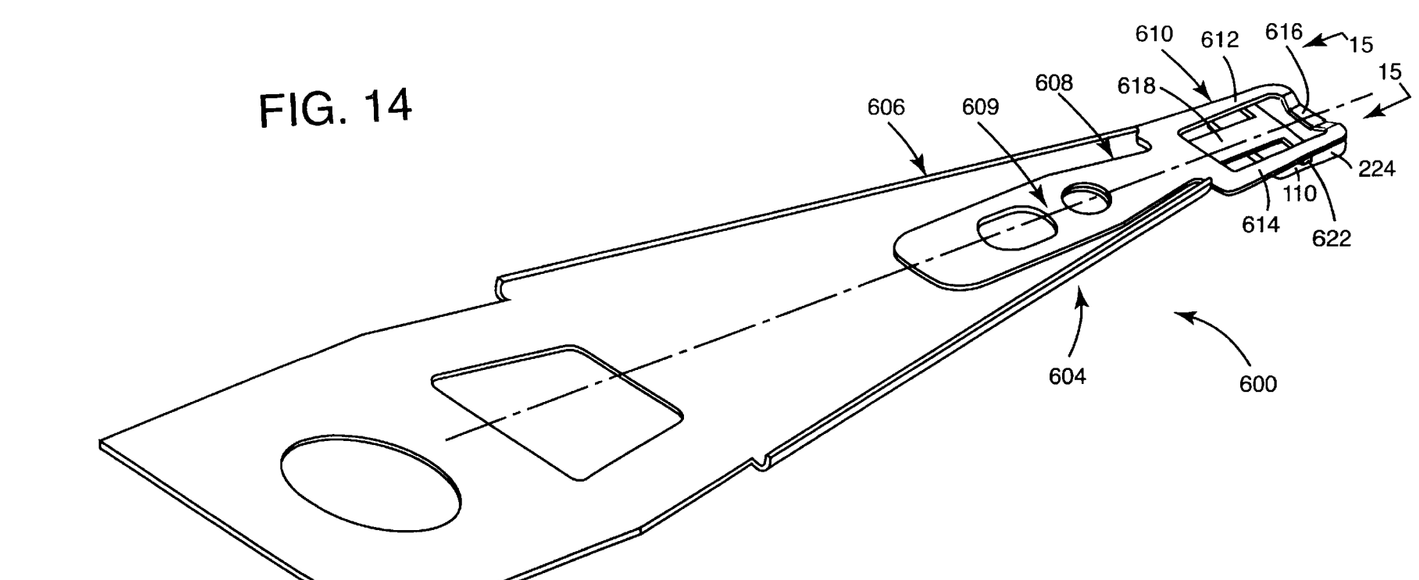
FIG. 14 is a perspective view of a suspension assembly according to another alternative embodiment of the present invention.
Figure 15:
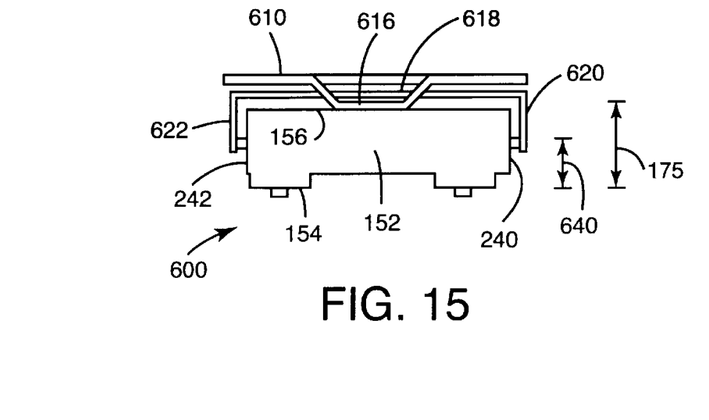
FIG. 15 is a front, plan view of the suspension assembly shown in FIG. 14, as viewed along lines 15—15 of FIG. 14.

FIG. 14 is a perspective view of a suspension assembly 600 according to another alternative embodiment of the present invention. FIG. 15 is a front, plan view of suspension assembly 600, as viewed along lines 15—15 of FIG. 14. Suspension assembly 600 includes suspension 604, which carries slider 110. As in the embodiment shown in FIG. 13, suspension 604 includes a load beam 606 and a gimbal 608, which is attached to the back surface of load beam 606, with respect to slider 110. Gimbal 608 includes a proximal mounting section 609 attached to load beam 606, and a distal flexure portion 610 attached to slider 110. Flexure portion 610 includes gimbal arms 612 and 614 and mounting tab 616. Mounting tab 616 is bent out-of-plane with respect to gimbal arms 612 and 614 and is adhered to the back surface of slider 110.

Load beam 606 has a distal end 618 having a pair of laterally extending arms 620 and 622 (620 shown in FIG. 15), which attach to slider 110 along side edges 240 and 242, respectively, for transferring the load force from load beam 606 to slider 110. Lateral arms 620 and 622 contact side edges 240 and 242 at a vertical distance 640 from bearing surface 154 that is less than the nominal thickness 175 of slider 110. For example, lateral arms 620 and 622 can contact side edges 240 and 242 at the midpoint along thickness 175. This mid-level load transfer reduces the lever arm of the tipping torque and hence the tipping torque itself by effectively one half as compared to a load force applied to back surface 156. The suspensions shown in FIGS. 12–15 are provided as examples only. Other suspension configurations can also be used.

Although the present invention has been described with reference to illustrative embodiments, workers skilled in the art will recognize that changes may be made in form and detail without departing from the spirit and scope of the invention. For example, the slider can be a non-contact type, a contact type or a pseudo-contact type slider. The particular bearing geometry can be a positive pressure air bearing ("PPAB") or a negative pressure air bearing ("NPAB"), for example. Other geometries can also be used. In addition, various types of suspensions can be used in accordance with the present invention.

What is claimed is:

1. A disc head slider comprising:
   a slider body comprising a leading slider edge, a trailing slider edge, a bearing surface, a back surface, which is opposite to the bearing surface and a length measured from the leading slider edge to the trailing slider edge;
   first and second rails extending normally from the slider body and having raised surfaces that together form the bearing surface;
   first and second discrete pads extending normally from the first rail, wherein the first pad is located forward of a midpoint along the length and the second pad is located rearward of the midpoint and forward of the trailing slider edge;
   third and fourth discrete pads extending normally from the second rail, wherein the third pad is located forward of the midpoint and the fourth pad is located rearward of the midpoint and forward of the trailing slider edge; and
   a recess formed in the back surface and having a recess floor, which defines a load point surface located between the first and second pads along the length, wherein the load point surface is parallel to and vertically offset from the back surface.

2. The disc head slider of claim 1 wherein:
   the slider body further comprises first and second side edges;
   the recess is formed in a central region of the back surface and is spaced from the leading and trailing slider edges and the first and second side edges; and
   the slider body has a nominal thickness surrounding the recess and a reduced thickness within the recess, as measured in a direction from the back surface toward the bearing surface.

3. The disc head slider of claim 2 wherein:
   the recess has a circular cross-section in a plane parallel to the back surface.

4. The disc head slider of claim 2 wherein the reduced thickness is approximately half of the nominal thickness.

5. The disc head slider of claim 1 wherein:
   the recess comprises a slot formed in the back surface and extending from the leading slider edge to the trailing slider edge.

6. The disc head slider of claim 1 wherein:
   the slider body further comprising first and second side edges; and
   the recess comprises a slot formed in the back surface and extending from the first side edge to the second side edge.

7. The disc head slider of claim 1 wherein:
   the slider body further comprising first and second side edges; and
   the recess extends from the leading slider edge, past a midpoint along the slider length and terminates prior to the trailing slider edge, and wherein the recess extends from the first side edge to the second side edge.

8. The disc head slider of claim 7 wherein the slider body has a nominal thickness between the recess and the trailing slider edge and has a reduced thickness within the recess, which is approximately half of the nominal thickness, as measured in a direction from the back surface toward the bearing surface.

9. A disc drive suspension assembly comprising:
   a disc head slider comprising:
      a slider body comprising a leading slider edge, a trailing slider edge, a bearing surface, a back surface, which is opposite to the bearing surface, a length measured from the leading slider edge to the trailing slider edge, and a nominal thickness measured from the back surface to the bearing surface;
      first and second rails extending normally from the slider body and having raised surfaces that together form the bearing surface;
      first and second discrete pads extending normally from the first rail, wherein the first pad is located forward of a midpoint along the length and the second pad is located rearward of the midpoint and forward of the trailing slider edge; and
      third and fourth discrete pads extending normally from the second rail, wherein the third pad is located forward of the midpoint and the fourth pad is located rearward of the midpoint and forward of the trailing slider edge; and
   a suspension supporting the disc head slider and having a load point, which contacts the disc head slider at a location that is between the first and second pads along the length and at a vertical distance from the bearing surface that is less than the nominal thickness.

10. The disc drive suspension assembly of claim 9 wherein the disc head slider further comprises:
    a recess formed in the back surface and having a recess floor, which defines a load point surface; and
    wherein the load point contacts the disc head slider at the load point surface.

11. The disc drive suspension assembly of claim 10 wherein:
    the slider body further comprises first and second side edges;
    the recess is formed in a central region of the back surface and is spaced from the leading and trailing slider edges and the first and second side edges; and
    the slider body has a nominal thickness surrounding the recess and a reduced thickness within the recess, as measured in a direction from the back surface toward the bearing surface.

12. The disc drive suspension assembly of claim 10 wherein:

the recess has a circular cross-section in a plane parallel to the back surface.

13. The disc drive suspension assembly of claim 10 wherein:

the recess comprises a slot formed in the back surface and extending from the leading slider edge to the trailing slider edge.

14. The disc drive suspension assembly of claim 10 wherein:

the slider body further comprising first and second side edges; and the recess comprises a slot formed in the back surface and extending from the first side edge to the second side edge.

15. The disc drive suspension assembly of claim 10 wherein:

the slider body further comprising first and second side edges; and the recess extends from the leading slider edge, past the midpoint along the slider length and terminates prior to the trailing slider edge, and wherein the recess extends from the first side edge to the second side edge.

16. The disc drive suspension assembly of claim 10 wherein the suspension is attached to the back surface of the slider in a plane that is vertically offset from the load point.

17. The disc drive suspension assembly of claim 10 wherein the disc head slider further comprises:

first and second side edges; and wherein the load point contacts the disc head slider along the first and second side edges.

18. A disc drive suspension assembly comprising:

a suspension having a load point; and slider means attached to the suspension for supporting a transducer relative to a disc surface and for receiving a load force through the load point.

19. A disc head slider comprising:

a slider body comprising a leading slider edge, a trailing slider edge, a bearing surface, a back surface, which is opposite to the bearing surface and a length measured from the leading slider edge to the trailing slider edge;

first and second rails extending normally from the slider body and having raised surfaces that together form the bearing surface and terminate prior to the trailing slider edge;

first and second discrete pads extending normally from the first rail, wherein the first pad is located forward of a midpoint along the length and the second pad is located rearward of the midpoint and forward of the trailing slider edge;

third and fourth discrete pads extending normally from the second rail, wherein the third pad is located forward of the midpoint and the fourth pad is located rearward of the midpoint and forward of the trailing slider edge; and a recess formed in the back surface and having a recess floor, which is parallel to the back surface and defines a load point surface located between the first and second pads along the length and at a substantial vertical distance from the back surface.

20. A disc drive suspension assembly comprising:

a disc head slider comprising:

a slider body comprising a leading slider edge, a trailing slider edge, a bearing surface, a back surface, which is opposite to the bearing surface, a length measured from the leading slider edge to the trailing slider edge, and a nominal thickness measured from the back surface to the bearing surface;

first and second rails extending normally from the slider body and having raised surfaces that together form the bearing surface;

first and second discrete pads extending normally from the first rail, wherein the first pad is located forward of a midpoint along the length and the second pad is located rearward of the midpoint and forward of the trailing slider edge; and third and fourth discrete pads extending normally from the second rail, wherein the third pad is located forward of the midpoint and the fourth pad is located rearward of the midpoint and forward of the trailing slider edge; and a suspension attached to the back surface of the disc head slider and having a load point, which contacts the disc head slider at a location that is between the first and second pads along the length and at a vertical distance from the bearing surface that is less than the nominal thickness and vertically offset from the back surface.

\* \* \* \* \*

UNITED STATES PATENT AND TRADEMARK OFFICE
CERTIFICATE OF CORRECTION

PATENT NO.     : 6,344,948 B1
DATED          : February 5, 2002
INVENTOR(S)    : Tang et al.

It is certified that error appears in the above-identified patent and that said Letters Patent is hereby corrected as shown below:

Title page,
Item [60], Related U.S. Application Data, change "Sep. 23, 1999" to
-- Sep. 23, 1998 --.

Column 1,
Line 10, change "Sep. 23, 1999" to -- Sept. 23, 1998 --.

Signed and Sealed this

Third Day of June, 2003

JAMES E. ROGAN
*Director of the United States Patent and Trademark Office*